United States Patent [19]
Kildea

[11] Patent Number: 5,476,364
[45] Date of Patent: Dec. 19, 1995

[54] TIP SEAL AND ANTI-CONTAMINATION FOR TURBINE BLADES

[75] Inventor: Robert J. Kildea, North Palm Beach, Fla.

[73] Assignee: United Technologies Corporation, Hartford, Conn.

[21] Appl. No.: 966,985

[22] Filed: Oct. 27, 1992

[51] Int. Cl.$^6$ ............................................. F01D 5/18
[52] U.S. Cl. ............................................. 416/95; 416/96 R
[58] Field of Search ............................. 416/92, 95, 96 R, 416/96 A, 97 R, 97 A

[56] References Cited

U.S. PATENT DOCUMENTS

| | | | |
|---|---|---|---|
| 3,055,633 | 9/1963 | Pouit | 416/95 |
| 3,533,712 | 10/1970 | Kercher | 416/92 |
| 4,073,599 | 2/1978 | Allen et al. | 416/96 R |
| 4,197,443 | 4/1980 | Sidenstick | 416/97 A |
| 4,390,320 | 6/1983 | Eiswerth | 416/92 |
| 4,676,719 | 6/1987 | Auxier et al. | 416/97 R |
| 4,705,455 | 11/1987 | Sahm et al. | 416/97 R |
| 5,030,060 | 7/1991 | Liang | 416/95 |

FOREIGN PATENT DOCUMENTS

| 2066372 | 7/1981 | United Kingdom | 416/97 A |
|---|---|---|---|

OTHER PUBLICATIONS

"A Review of Blade-Cooling Systems" by R. I. Hodge and I. H. Johnston Part 2–from the Oil Engine, Feb., 1958.

Primary Examiner—Charles T. Jordan
Assistant Examiner—Theresa M. Wesson
Attorney, Agent, or Firm—Norman Friedland

[57] ABSTRACT

A cavity judiciously dimensioned and located adjacent the tip's surface discharge port of internally cooling passage of the airfoil of the turbine blade of a gas turbine engine and extending from the pressure surface to the back wall of the discharge port guards against the contamination and plugging of the discharge port.

7 Claims, 4 Drawing Sheets

TIP SEAL AND ANTI-CONTAMINATION FOR TURBINE BLADES

This invention was made under a U.S. Government contract and the Government has rights herein.

CROSS REFERENCE

The subject matter of this patent application relates to the subject matter contained in U.S. patent application Ser. No. 07/236,094 filed on Aug. 24, 1988 by F. W. Huber et al and entitled "Clearance Control for the Turbine of a Gas Turbine Engine" and assigned to United Technologies Corporation, the assignee of this patent application.

TECHNICAL FIELD

This invention relates to internally cooled turbine blades for gas turbine engines and particularly to means for preventing contamination and plugging of the holes on the tip of the blade utilized in tip sealing and blade cooling.

BACKGROUND ART

As is well known in the gas turbine engine field of technology a great effort has been devoted to improve engine operating performance by attempting to hold the clearance of the gap between the outer air seal and the tip of the turbine blade at a minimum during the full range of the engine's operating envelope. What has developed over the years is a host of inventions and concepts that have through active and passive clearance controls attempted to achieve this end. To some degree, many of these inventions and concepts have proven to be successful, but owing to the increasing demands on engine and aircraft performance, the problem has become increasingly more difficult. The solution to the problem is also predicated on the type of aircraft/engine being designed and to its particular mission. What may be satisfactory for say, aircraft used by commercial airlines is typically not satisfactory for military aircraft, particularly those designed to be in the fighter class.

For example, in engines designed for use in aircraft used for commercial applications, such as those used in revenue service, the active clearance controls have been proven to be fairly successful. An example of an active clearance control that has met considerable commercial success is exemplified in U.S. Pat. No. 4,069,662 granted to Redinger et al on Jan. 24, 1979 and assigned to the assignee common with this patent application. This type of control judiciously impinges air on the engine's outer case in proximity to the turbine rotor in order to shrink the case at predetermined times during its operating envelope and hence, position the outer air seal closer to the tips of the turbine or compressor blades so as to reduce the gap.

In contrast to the active clearance control design philosophy, the passive clearance control utilizes a continuous means to effectuate the control of these clearances. For example, one such system continuously impinges cooling air on the outer engine case in proximity to the rotor blades to limit the rate of expansion of the outer case subjected to elevated temperatures in order to hold clearances to a minimum. In short the "active" type of control requires a control system that responds to an input and applies hot or cold air or mechanical means in order to effectuate control of the clearances. The "passive" type of clearance control doesn't require a control system and is in a quiescent state at all times.

This invention contemplates a passive type of clearance control that utilizes the discharge air used for internally cooling of the turbine blades for controlling the effective clearances between the tip of the turbine blade and the outer air seal. Means are disclosed for imposing an aerodynamic seal in the gap between the outer air seal and tips of the blades so as to minimize flow therein and hence, reduce the flow from the high pressure side of blade to the low pressure side thereby increasing the efficiency of the turbine. Essentially, discharge holes drilled into the tip of the turbine blade near the intersection of the tip surface with the airfoil pressure side surface discharge a jet of cooling air into the gap between the outer air seal and the tips of the blade. In certain application intersecting holes may be employed. One of the holes communicates with the internal coolant passage adjacent the pressure side and the other hole communicates with the internal coolant passage adjacent the suction side. The holes intersect to affect the velocity (momentum) and angle of the spent cooling air discharging from the slot formed from the two drilled holes.

Tip holes and intersecting holes in air cooled turbine blades are known in the art. For example, U.S. Pat. Nos. 4,540,339 granted to Horvath on Sep. 10, 1985 and 5,062,768 granted to Marriage on Nov. 5, 1991 each disclose intersecting holes located at the tip of the turbine blade. In one instance, the flow egressing from these discharge holes serves to scrub the side wall surfaces of the squealer tip cap and in the other instance the intersecting holes decrease the likelihood of contamination and hole blockage. While these patent do not address the use of these holes for aerodynamic sealing, there are known apparatus that utilize tip holes for aerodynamic sealing.

As disclosed in the prior art, there is a concern that foreign matter and particularly scrapings occasioned by blade tip rubs migrate to the discharge ports in the tips of the blade adversely affecting the flow discharging therefrom. This problem has become more acerbated because the blade tips are currently being coated with abrasive material which has the propensity of having particles becoming dislodged in a blade rub. Obviously this increases the possibility of clogging these discharge ports which not only has an impact on the cooling effectiveness of the cooling passage and the discharging flow, but also in a tip sealing configuration, the plugged up holes adversely affects the tip sealing capabilities and hence, degrade the turbine's efficiency.

DISCLOSURE OF INVENTION

An object of this invention is to provide for internally cooled turbine blades used in gas turbine engines improved means for preventing the contamination, plugging or clogging of the discharge holes located on the tips of the axial flow turbine blades.

A feature of this invention is to provide in a turbine blade as described a cavity adjacent the discharge hole utilized for tip sealing such that the discharge hole, cavity, and blade configurations bear a given relationship relative to each other.

The foregoing and other features of the present invention will become more apparent from the following description and accompanying drawings.

BEST MODE FOR CARRYING OUT THE INVENTION

As will become apparent in the description to follow the objective of this invention is to prevent plugging of the tip holes utilized in an air cooled axial flow turbine blade tip sealing and blade cooling configuration. While there are many configurations of these tip holes, it is to be understood that the objective of this invention is to preclude the plugging of these holes and it is contemplated within the scope of this invention that my invention is not limited by the particular hole configuration and location other than by what is claimed herein.

As will be appreciated by one skilled in this art, the turbine blade is one of a plurality of axial flow turbine blades supported in a disk of the turbine rotor and is driven by the hot gases developed in the combustion section of the gas turbine engine. Essentially, the energy extracted by the turbine serves to drive the compressors of the engine and produce thrust. Because the turbine closest to the combustion section, referred to in the industry as the first stage turbine, sees perhaps the highest temperature of all the components of the engine means are employed to cool the turbine blades. Turbine blade cooling is well known and for the purposes of understanding this invention it is only necessary to understand that in most turbine blade cooling schemes there is typically included an internal longitudinal passageway that supplies pressurized cooling air to be used for shower head cooling, film cooling and the like.

Figure 1:
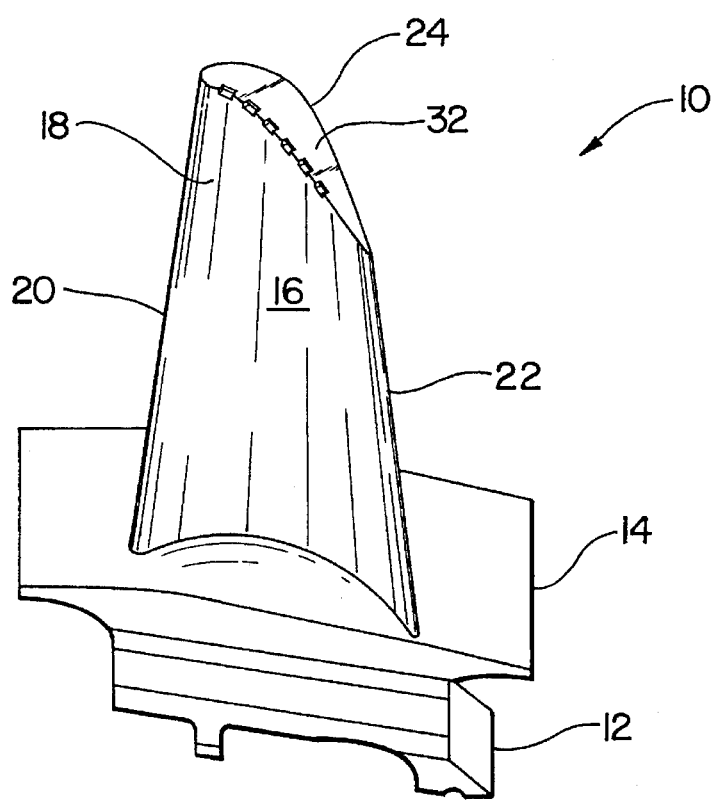
FIG. 1 is a perspective view of a turbine blade for a gas turbine engine incorporating this invention.
Figure 2:
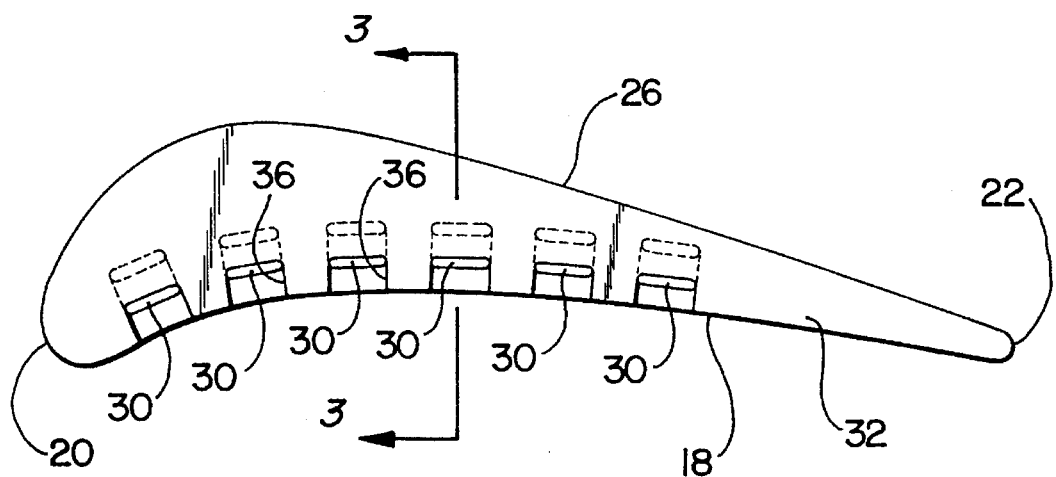
FIG. 2 is a top plan view of the blade illustrated in FIG. 1.
Figure 3:
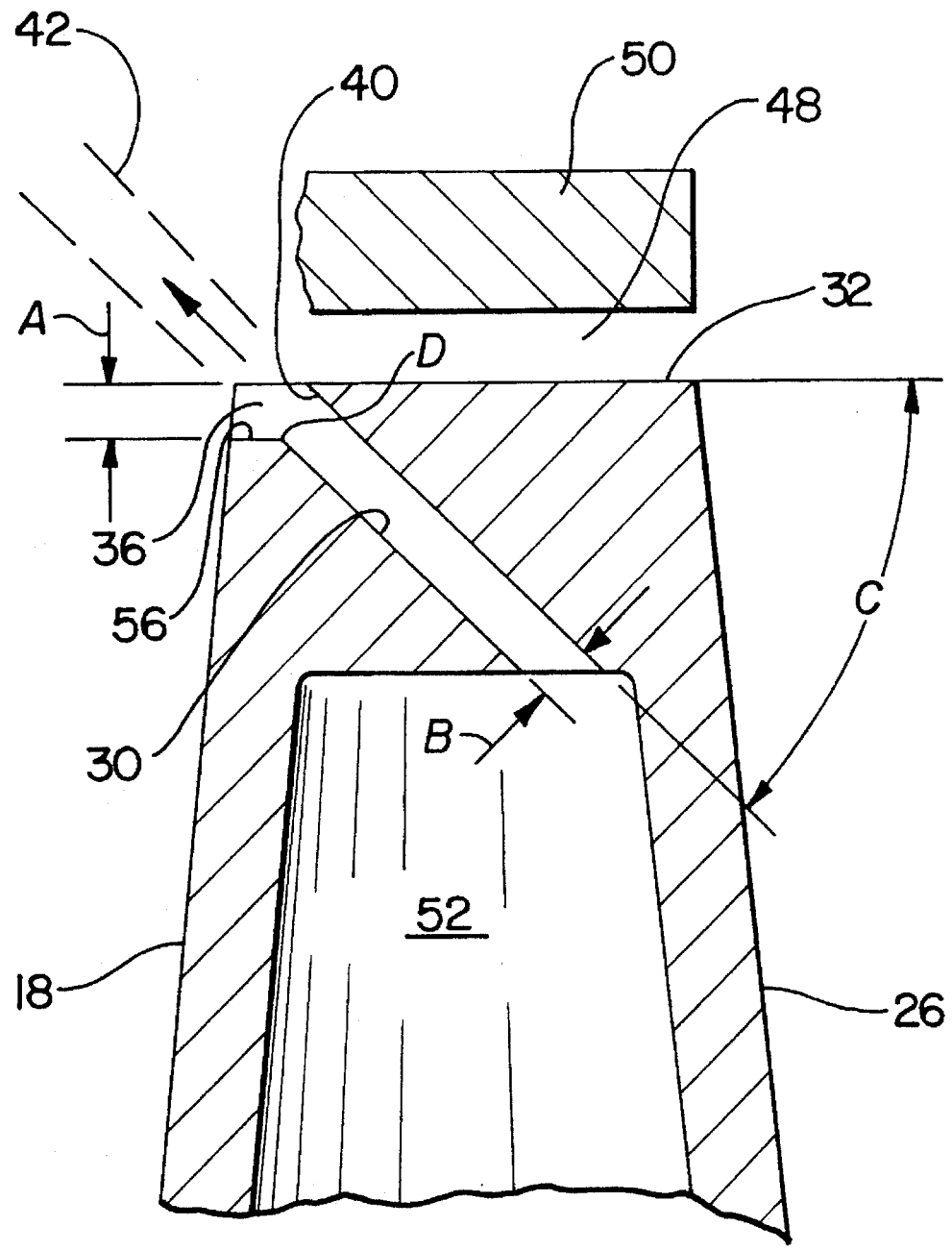
FIG. 3 is partial view in section taken along lines 3—3 of FIG. 2.

A better understanding of this invention may be had by referring to FIGS. 1–3 which disclose a turbine blade generally indicated by reference numeral 10 as having a root section 12, platform 14, and airfoil section 16. Air, typically routed from the compressor section (not shown) is admitted internally of the blade into the bottom end of the root section 12 and discharged into the gas path through the air discharge holes, as the shower head and film cooling holes (not shown). Since this invention is primarily concerned with the tip sealing and cooling holes, the description, for the sake of convenience and simplicity, will be limited to this portion of the blade. For additional details reference should be made to U.S. Pat. No. 4,257,737 granted to D. E. Andress et al on Mar. 24, 1981 entitled "Cooled Rotor Blade", and U.S. Pat. No. 4,753,575 granted to J. L. Levengood et al on Jun. 28, 1988 entitled "Airfoil with Nested Cooling Channels", both of which are assigned to United Technologies Corporation, the assignee common with this patent application, and which are incorporated herein by reference. The airfoil section 16 consists of a pressure side 18, leading edge 20, trailing edge 22, tip surface 32 and the suction side 24 which is on the opposite face from the pressure side of the airfoil.

As can be seen in FIGS. 2 and 3, the tip of the blade includes a plurality of spaced holes or slots 30 extending chordwise from the leading edge 20 to trailing edge 22. Prior to this invention, these holes extended from an internal cooling passage to the tip section and terminated flush with the outer surface 32. In accordance to this invention, cavity 36, with certain critical dimensions and constraints, is formed in the outer surface 32 in proximity to hole 30. Since all of the cavities and their criteria relative to the holes 30 are identical, only one of the holes and cavities will be described for the sake of convenience and simplicity.

As can be seen in FIG. 3 the cavity 36 extends from the edge of the pressure side toward the suction side 26 up to the back wall 40 of hole 30. In the other direction, from the leading edge 20 toward the trailing edge 22, cavity 36 extends substantially over the width of hole 30. There are other critical constrains of cavity 36. In certain constraints the discharging air stream or jet 42 from hole 30 must be taken into consideration. Looking at the transverse plane taken through the air jet, hole 30 is located so that the outboard edge 44 is contained within the boundaries defined by the gap 48 and the extension of pressure side 18. The lines illustrating the air jet are only illustrative since the air would impinge on the outer air seal 50. While the depth of cavity 36 (represented by reference letters A) is not deemed critical, it should be at least seventy-five percent (75%) of the thickness of the slot 30 (depicted by the reference letter B).

It is important that the surface 40 of hole 30 extend radially to the tip surface 32. The angle that the surface 40 makes with the tip surface 32, as represented by reference letter C, should be selected to maximize aerodynamic sealing so as to enhance turbine efficiency and hence, optimize engine performance.

By virtue of this invention, the angle C, which should be designed to optimize engine performance, will be greater than the angle obtained in heretofore known designs which do not incorporate this invention, namely, cavity 30. Of significance, by increasing the optimum angle C better performance will be realized in the trailing edge region where angle C must be increased to allow hole 30 to intersect the internal cooling passage 52, which is in fluid communication with hole 30. It is expected that the internal cooling passage 52, which is a source of pressurized cooling air, will desensitize the performance of this feature in the trailing edge region to the location tolerance from the pressure side 18.

The reasons why an optimum angle C will be higher for holes incorporating this invention can be understood in the description immediately hereinbelow. First, by having the pressure side of the air jet exposed to the high static pressure on the pressure side of the airfoil, additional flow will be drawn in and accelerated by the jet 42. Since this air has more "access" at higher angles this will result in allowing the optimum angle to be at a higher angle.

Figure 4:
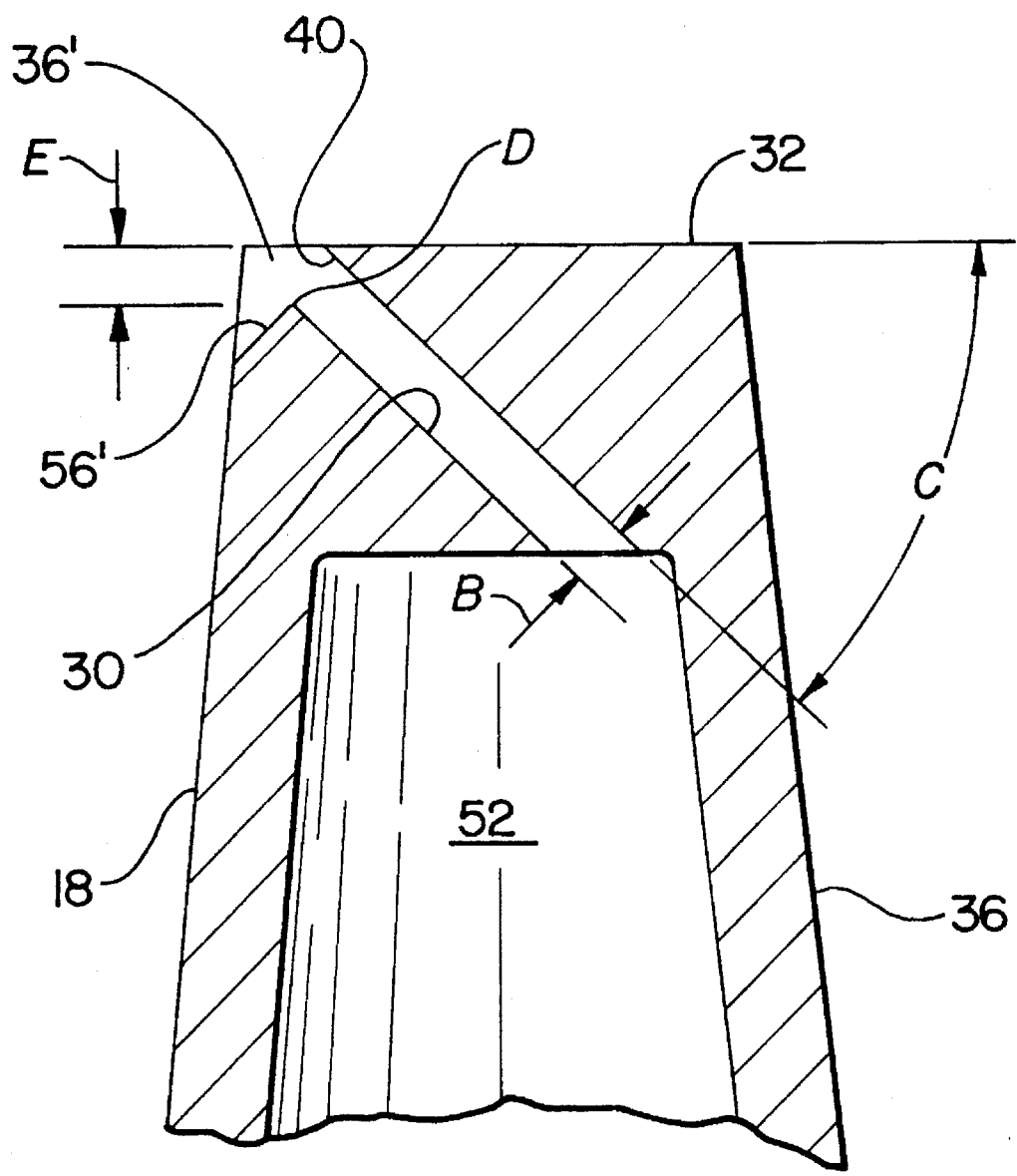
FIG. 4 is a partial view in section illustrating another embodiment of this invention.
Figure 5:
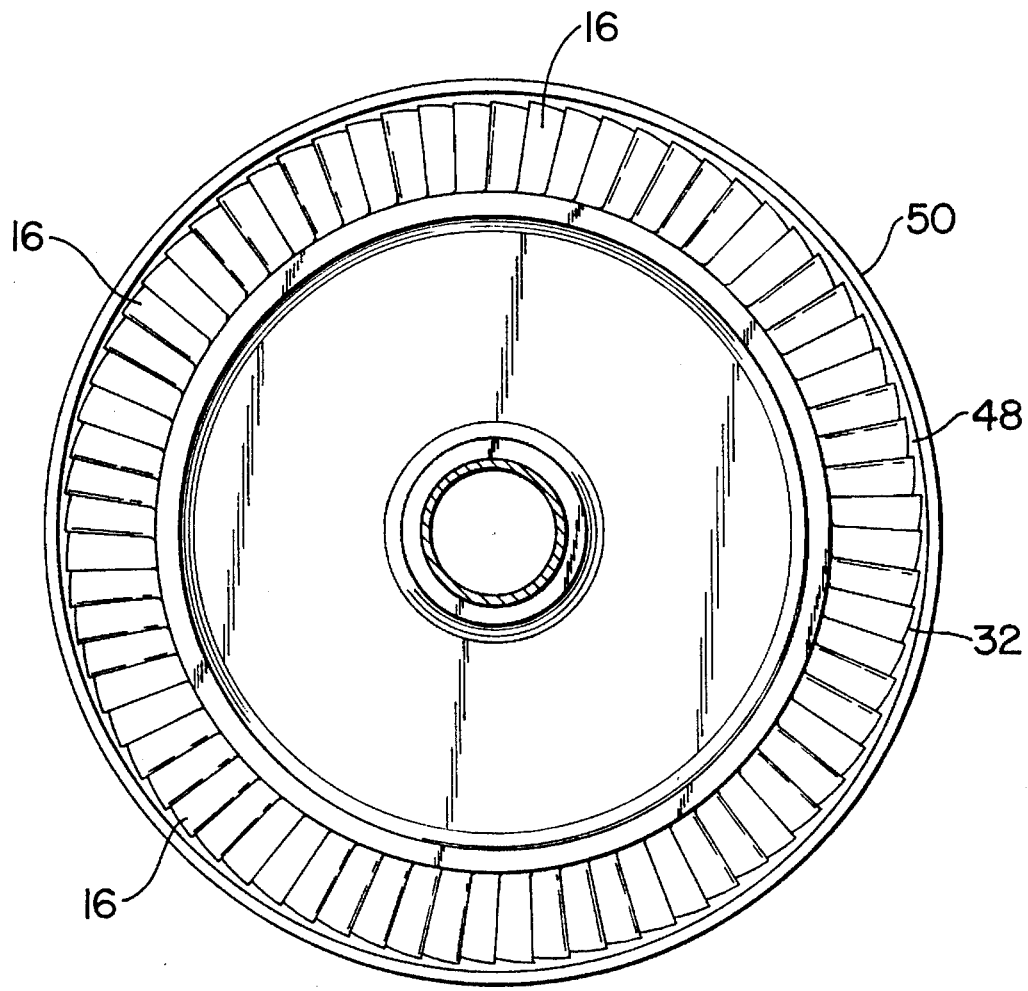
FIG. 5 is a view illustrating the annular shroud and the circumferentially spaced airfoils of the blade illustrated in FIG. 1.

Second, a cavity, such as the one shown in FIG. 4 (36') will increase the effect described in the paragraph appearing immediately above, and further increase the optimum angle C. (The air has still greater access). However, it will be noted that this configuration in FIG. 4 could be limited by heating of surface 56' since the additional air will be gas path air, which is at a much higher temperature than the air of jet 42.

And, third, increase sealing will occur on blades which have rubbed against the outer air seal 50 (FIG. 3), since a rub is likely to leave a thin "flash" of material over the hole. By utilizing this invention, instead of blocking jet 42, this "flash" will divert jet 42 to a lower effective angle C (closer to the optimum angle)

This invention contemplates within its scope that the angle of surface 56' relative to hole 30 be increased as shown in FIG. 4 to further enhance performance. However to be within the constraints of the critical dimensions, recited in the above description, the depth of cavity 36' will be the same as in FIG. 3, however, the depth will be measured at a plane extending through the junction of where the cavity 36' intersects hole 30 parallel to surface 32. (All like reference numeral refer to identical elements in all the FIGS.) The junction point is depicted by reference letter D and this dimension is illustrated by the arrows depicted by reference letter E.

Cavities 36 (FIG. 3) and 36' (FIG. 4) are fabricated by a suitable and known electro discharge machine (EDM) that is typically used in the hole drilling operation. To obtain the size and shape of these cavities the electrode of the EDM machine is shaped in a well known manner to form this recess. In current designs the holes 30 have evolved into slots, as shown, and for purposes of the description herein the terms "holes" and "slots" are used interchangeably. It is, however, important to note that in heretofore known designs, in order to attain the desired performance results, slots measured substantially 0.050 inch in length and 0.012 inch in width and needed to break out fully within the tip surface and very close to the pressure surface. This presented a difficult manufacturing operation and hence, posed a manufacturing problem. To a great extent, incorporating this invention alleviated this problem.

By virtue of this invention and not by way of limitation, this invention affords the following improvements:

1. It minimizes the possibility of plugging the tip holes by smearing material during a blade tip rub, hence, assuring that the sealing and cooling features of the hole are retained.

2. it improves producibility of tip holes by desensitizing the performance gain to the tolerance of hole position relative to the pressure side of the airfoil.

3. It improves the tip sealing performance where angle C (FIG. 3) must be increased because of space limitations.

4. It makes tip sealing hole configurations more compatible when the blade tip surfaces are coated with abrasive materials which present problems in drilling EDM holes and/or masking the holes if they are drilled.

Although this invention has been shown and described with respect to detailed embodiments thereof, it will be appreciated and understood by those skilled in the art that various changes in form and detail thereof may be made without departing from the spirit and scope of the claimed invention.

I claim:

1. For an internally cooled airfoil of a blade of a turbine rotor of a gas turbine engine, said airfoil subjected to the fluid working medium of said gas turbine engine and including a tip surface, a leading edge, a trailing edge and a pressure side, an annular shroud concentrically supported around said airfoil and defining with said tip surface a gap, said airfoil having wall means for defining an internal passageway leading cooling air to a discharge port formed adjacent the tip of the airfoil in proximity to the pressure surface for creating a jet of cooling air egressing into said gap at a given angle for creating a blockage in said gap to seal the gap and prevent leakage of said fluid working medium from entering into said gap, means for guarding against the clogging of said discharge port including a cavity formed adjacent said discharge port and extending from said pressure surface to the portion of said wall means defining said discharge port that is furthest away from said pressure surface and extending substantially the width of said discharge port.

2. For an internally cooled airfoil as claimed in claim 1 wherein said turbine rotor includes a plurality of circumferentially spaced airfoils and said shroud defining with the tip surface of said airfoils an annular gap.

3. For an internally cooled airfoil as claimed in claim 1 including a plurality of said cavities spaced longitudinally along said pressure surface extending from said leading edge to said trailing edge.

4. For an internally cooled airfoil as claimed in claim 3 wherein said cavity includes a deeper portion adjacent said pressure surface and fairing to a less deep portion adjacent said discharge port.

5. For an internally cooled airfoil as claimed in claim 1 wherein the discharge port is a slot.

6. For an internally cooled airfoil as claimed in claim 5 wherein the depth of said cavity is substantially equal to at least seventy-five percent of the thickness of said slot.

7. For an internally cooled airfoil as claimed in claim 4 wherein said discharge port is a slot and the depth of said cavity is substantially equal to at least seventy-five percent of the thickness of said slot as measured adjacent the juncture where said cavity and said slot intersect.

* * * * *